US010580296B2

(12) United States Patent
Pedersen et al.

(10) Patent No.: US 10,580,296 B2
(45) Date of Patent: Mar. 3, 2020

(54) ADVANCED THREAT WARNING FOR AUTONOMOUS VEHICLES

(71) Applicants: Nissan North America, Inc., Franklin, TN (US); United States of America as Represented by the Administrator of NASA, Washington, DC (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Terrence Fong, Moffett Field, CA (US); Mark Allan, Campbell, CA (US); Maria Bualat, San Jose, CA (US); Eric Schafer, Kentfield, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/461,200

(22) PCT Filed: Dec. 6, 2017

(86) PCT No.: PCT/US2017/064821
§ 371 (c)(1),
(2) Date: May 15, 2019

(87) PCT Pub. No.: WO2018/106757
PCT Pub. Date: Jun. 14, 2018

(65) Prior Publication Data
US 2019/0311621 A1    Oct. 10, 2019

Related U.S. Application Data

(60) Provisional application No. 62/430,814, filed on Dec. 6, 2016.

(51) Int. Cl.
*G08G 1/0967* (2006.01)
*G01C 21/34* (2006.01)
(Continued)

(52) U.S. Cl.
CPC ....... *G08G 1/0967* (2013.01); *G01C 21/3461* (2013.01); *G01C 21/3492* (2013.01);
(Continued)

(58) Field of Classification Search
CPC ............... G08G 1/0967; G08G 1/0962; G01C 21/3461; G01C 21/3492; G01C 21/3697;
(Continued)

(56) References Cited

U.S. PATENT DOCUMENTS 5,182,555 A    1/1993    Sumner
7,579,942 B2   8/2009    Kalik
(Continued)

FOREIGN PATENT DOCUMENTS

GB    2549662 A       10/2017
JP    H08335298 A     12/1996
(Continued)

OTHER PUBLICATIONS

Extended European Search Report of corresponding application EP 17877972.4; dated Nov. 19, 2019; 9 pages.

*Primary Examiner* — Dale W Hilgendorf
(74) *Attorney, Agent, or Firm* — Young Basile Hanlon & MacFarlane, P.C.

(57) ABSTRACT

Methods, apparatuses, systems, and non-transitory computer readable storage media for generating risk indicators are described. The disclosed technology includes determining a vehicle route of a vehicle and external object routes of external objects. The vehicle route is determined using vehicle route data including a vehicle location and a vehicle destination. The external object routes are determined using
(Continued)

external object route data including external object locations and external object destinations. Based on a comparison of the vehicle route data and the external object route data, external object routes that satisfy a proximity criterion are determined. Risk data for the vehicle is generated based on a vehicle state of the vehicle and external object states of the external objects corresponding to the external object routes that satisfy the proximity criterion. In response to determining that the risk data satisfies a risk criterion, at least one risk indicator is generated.

20 Claims, 9 Drawing Sheets

(51) Int. Cl.
G01C 21/36 (2006.01)
G08G 1/0962 (2006.01)
G08G 1/16 (2006.01)
G08G 1/01 (2006.01)
G05D 1/02 (2006.01)

(52) U.S. Cl.
CPC ..... *G01C 21/3691* (2013.01); *G01C 21/3697* (2013.01); *G08G 1/0133* (2013.01); *G08G 1/0962* (2013.01); *G08G 1/096775* (2013.01); *G08G 1/096791* (2013.01); *G08G 1/163* (2013.01); *G08G 1/166* (2013.01); *B60W 2550/14* (2013.01); *B60W 2550/20* (2013.01); *B60W 2550/408* (2013.01); *G05D 1/0276* (2013.01); *G05D 2201/0213* (2013.01)

(58) Field of Classification Search
CPC ............. G01C 21/3691; G05D 1/0276; G05D 2201/0213
See application file for complete search history.

(56) References Cited

U.S. PATENT DOCUMENTS

| | | | |
|---|---|---|---|
| 8,606,512 B1 | 12/2013 | Bogovich et al. | |
| 8,612,131 B2* | 12/2013 | Gutierrez et al. | G01C 21/3691 |
| | | | 701/301 |
| 8,825,265 B1 | 9/2014 | Ferguson et al. | |
| 8,880,272 B1 | 11/2014 | Ferguson et al. | |
| 9,656,606 B1* | 5/2017 | Vose et al. ......... | G01C 21/3461 |
| 9,842,496 B1* | 12/2017 | Hayward ........... | G01C 21/3691 |
| 2007/0103294 A1* | 5/2007 | Bonecutter et al. ... | G08B 21/10 |
| | | | 340/539.18 |
| 2010/0036599 A1 | 2/2010 | Froeberg et al. | |
| 2010/0228419 A1 | 9/2010 | Lee et al. | |
| 2016/0061172 A1 | 3/2016 | Sato | |
| 2016/0086285 A1 | 3/2016 | Peters et al. | |
| 2016/0138930 A1* | 5/2016 | Akiyama et al. .. | G01C 21/3461 |
| | | | 701/465 |
| 2017/0241791 A1* | 8/2017 | Madigan et al. .. | G01C 21/3461 |

FOREIGN PATENT DOCUMENTS

| | | |
|---|---|---|
| JP | 2009251876 A | 10/2009 |
| JP | 2014194182 A | 10/2014 |
| JP | 2015228090 A | 12/2015 |
| JP | 2016181140 A | 10/2016 |
| WO | 2016/139748 | 3/2015 |
| WO | 2016/113893 A1 | 7/2016 |

* cited by examiner

US 10,580,296 B2

ADVANCED THREAT WARNING FOR AUTONOMOUS VEHICLES

TECHNICAL FIELD

This application relates generally to autonomous vehicles, and more particularly to an advanced threat warning system for autonomous vehicle operation.

BACKGROUND

Though an autonomous vehicle relieves a driver from the burden of having to operate a vehicle, there are situations in which capturing the attention of a driver, including locally based drivers (e.g., a driver in the vehicle) and remote drivers (e.g., an operator at an autonomous vehicle operations center), can be important. Because the safety of the passengers of the autonomous vehicle is of paramount importance, it is useful to sometimes make passengers aware of activity that is occurring outside of the vehicle.

SUMMARY

Disclosed herein are aspects, features, elements, implementations, and implementations for generating risk indicators associated with autonomous vehicles.

An aspect of the disclosed implementations includes a method for generating risk indicators, the method comprising: determining a vehicle route of a vehicle and external object routes of external objects, the vehicle route determined using vehicle route data including a vehicle location and a vehicle destination, the external object routes determined using external object route data including external object locations and external object destinations; determining, based on a comparison of the vehicle route data and the external object route data, external object routes that satisfy a proximity criterion; generating risk data for the vehicle based on a vehicle state of the vehicle and external object states of the external objects corresponding to the external object routes that satisfy the proximity criterion; and in response to determining that the risk data satisfies a risk criterion, generating at least one risk indicator.

An aspect of the disclosed implementations includes a risk indicator apparatus, the risk indicator apparatus comprising a memory and a processor configured to execute instructions stored in the memory to: determine a vehicle route of a vehicle and external object routes of external objects, the vehicle route determined using vehicle route data including a vehicle location and a vehicle destination, the external object routes determined using external object route data including external object locations and external object destinations; determine, based on a comparison of the vehicle route data and the external object route data, external object routes that satisfy a proximity criterion; generate risk data for the vehicle based on a vehicle state of the vehicle and external object states of the external objects corresponding to the external object routes that satisfy the proximity criterion; and in response to determining that the risk data satisfies a risk criterion, generate at least one risk indicator.

An aspect of the disclosed implementations includes a non-transitory computer-readable storage medium including program instructions executable by one or more processors of a risk indicator apparatus that, when executed, cause the one or more processors to perform operations, the operations comprising: determining a vehicle route of a vehicle and external object routes of external objects, the vehicle route determined using vehicle route data including a vehicle location and a vehicle destination, the external object routes determined using external object route data including external object locations and external object destinations; determining, based on a comparison of the vehicle route data and the external object route data, the external object routes that satisfy a proximity criterion; generating risk data for the vehicle based on a vehicle state of the vehicle and external object states of the external objects corresponding to the external object routes that satisfy the proximity criterion; and in response to determining that the risk data satisfies a risk criterion, generating at least one risk indicator.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
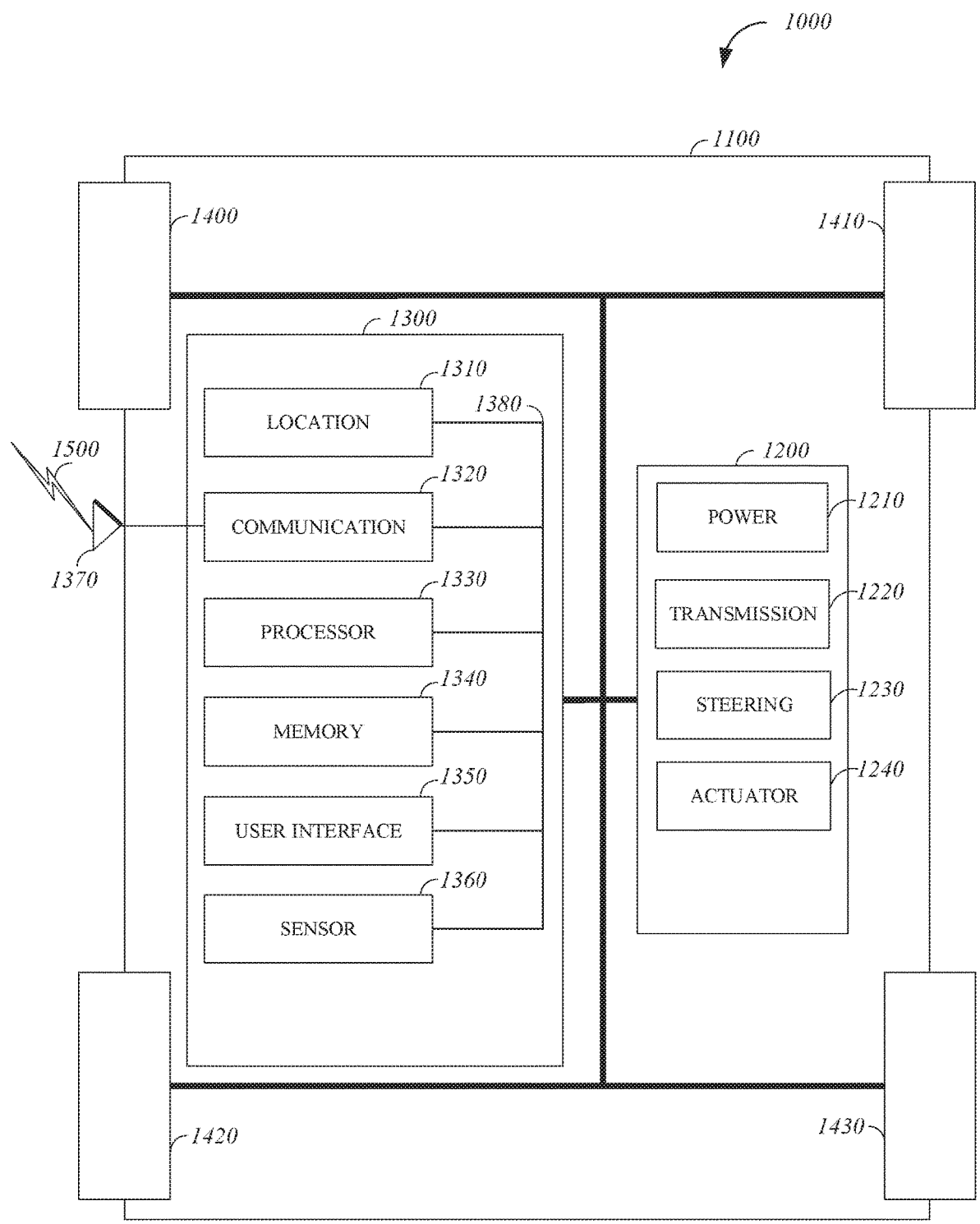
FIG. 1 is a diagram of an example of a portion of a vehicle in which the aspects, features, and elements disclosed herein may be implemented.

Much focus is placed on vehicle safety improvements related to the effectiveness and reliability of mechanical and electronic systems of the vehicle. To this end, vehicles are equipped with a variety of safety systems such as seatbelts, airbags, front crumple zones, and shatterproof glass, that protect the driver and other passengers when an adverse event, including a collision by the vehicle, occurs. However, such safety systems offer protection to passengers of the vehicle after an adverse event has occurred but do not assist in warning the driver (e.g., a human driver or a remote operator of the vehicle) before the adverse event has occurred. What is needed is a system that warns vehicle operators of threats before avoidance of the threat is too late. In this way, proactive action may be taken to avert or minimize the harmful effects of an adverse event.

Accordingly, a method and system in accordance with the present disclosure and the disclosed technology, provides a proactive advanced threat warning system (also referred to as a risk indicator apparatus) that generates risk indicators by leveraging sensors located on or around the vehicle and by analyzing vehicle route data and external object data associated with the routes of the vehicle and the routes of the external objects respectively. The disclosed technology provides improved analysis of vehicle routes and the environment surrounding the vehicle in order to proactively determine portions of a vehicle route in which an adverse event, involving potential harm to the vehicle or a passenger of the vehicle, is more probable. Further, the disclosed technology analyses traffic flow patterns, the state of traffic control devices, the condition of the route traveled by the vehicle, and other parts of the environment in order to warn (via the generated risk indicators) the operator of the vehicle (or a remote monitoring system) of potential threats. In this way, operation of the vehicle is improved and passenger safety is enhanced.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components for advanced threat warning of autonomous vehicles. The development of new ways to provide advanced threat warning via generated risk indicators to, for example, identify the approach of external objects that can cause an adverse event to the vehicle being monitored thereby requiring management or attention and communicating instructions or information between the monitoring devices and the vehicles is fundamentally related to autonomous vehicle related computer networks.

Implementations of this disclosure provide at least a system, method, apparatus, and non-transitory computer readable storage media for generating risk indicators associated with advanced threat warnings. The system for generating risk indicators includes determining a vehicle route of a vehicle (e.g., the route that the vehicle is traveling) and external object routes of external objects (e.g., any objects external to the vehicle including but not limited to any of other vehicles and pedestrians). The vehicle route can be based on vehicle route data including a vehicle location (e.g., current location) and a vehicle destination of the vehicle. The external object routes can be based on external object route data including external object locations (e.g., current locations) and external object destinations of the external objects. The system determines, based on a comparison of the vehicle route data and the external object route data (e.g., a comparison performed using a lookup table), a set of the external object routes that satisfy a proximity criterion (e.g., the external object routes that are within a predefined proximity distance or area of the vehicle or the vehicle route).

Risk data for the vehicle can be generated using a vehicle state of the vehicle and external object states of external objects that correspond to the external object routes that satisfy the proximity criterion. The risk data can include the proximity, severity, or probability of an adverse event that can potentially happen and the risk data is indicated (e.g., via a display mechanism including but not limited to a graphical user interface or a LCD/LED display) to the vehicle (e.g., as a command that alters operation of the vehicle) or to a passenger in the vehicle (e.g., as a flashing red light on the navigation system). In response to a determination that the risk data satisfies a risk criterion, the system generates at least one risk indicator that is communicated to an operator of the vehicle or a system that is monitoring the vehicle (e.g., a remote operator). For example, the at least one risk indicator can include imagery including any of text, pictograms, and other symbols that can be generated and displayed on a display device of the vehicle to indicate the potential upcoming advanced threat warnings or risks.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some implementations, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some implementations, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some implementations, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some implementations, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some implementations, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some implementations, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some implementations, the sensor 1360 can be or include one or more video cameras, laser-sensing systems, infrared-sensing systems, acoustic-sensing systems, or any other suitable type of on-vehicle environmental sensing device, or combination of devices, now known or later developed. In some implementations, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some implementations, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some implementations, the optimized trajectory can be control inputs such as a set of steering angles, with each steering angle corresponding to a point in time or a position. In some implementations, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
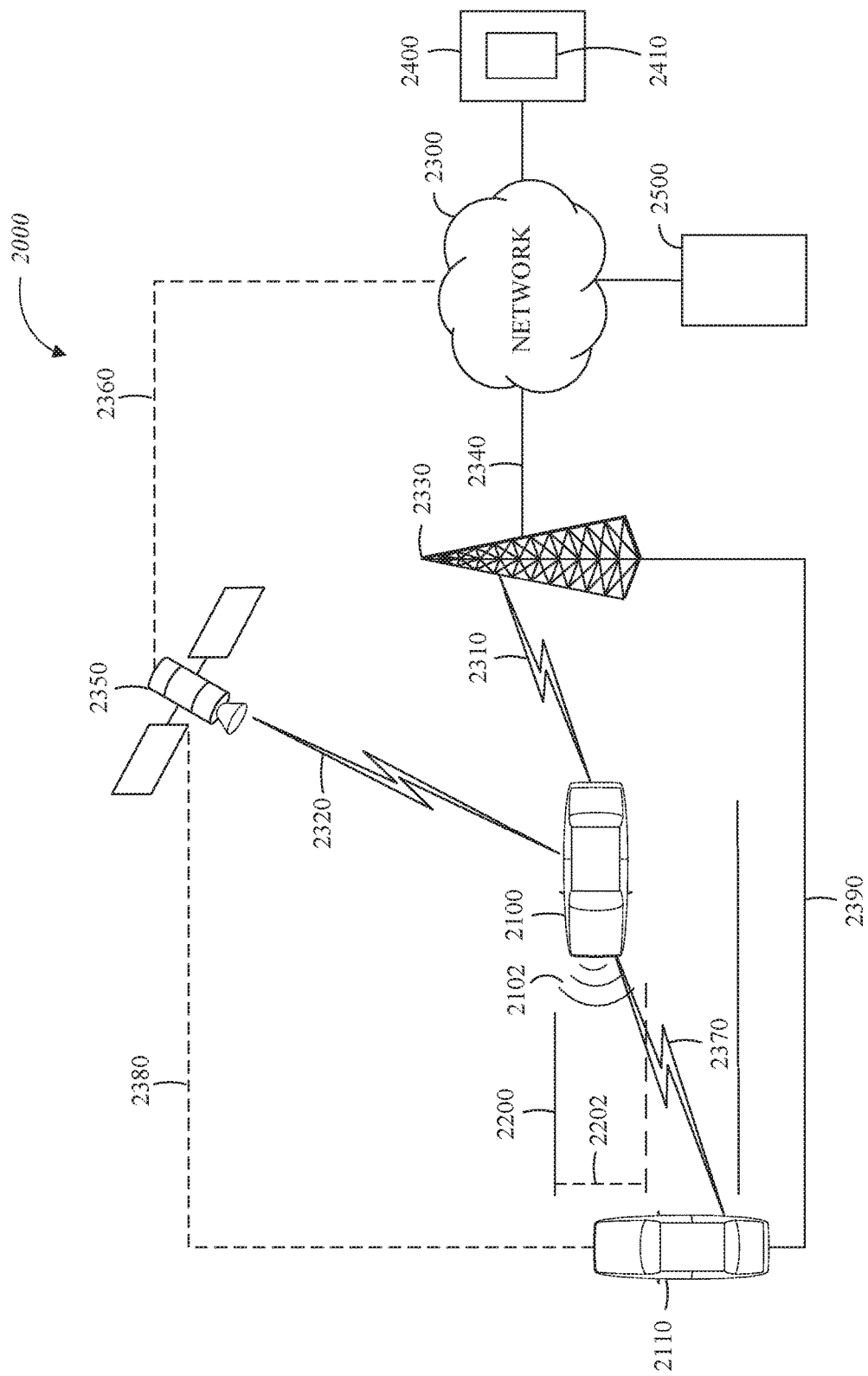
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some implementations the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some implementations, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a BLUETOOTH communication link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some implementations, the vehicle 2100 receives a message via a third party, such as a signal repeater (not shown) or another remote vehicle (not shown). In some implementations, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some implementations, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some implementations, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some implementations, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some implementations, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a BLUETOOTH communication link. Although, for simplicity, FIG. 2 shows one of the transportation network 2200, and one of the electronic communication network 2300, any number of networks or communication devices may be used.

Figure 3:
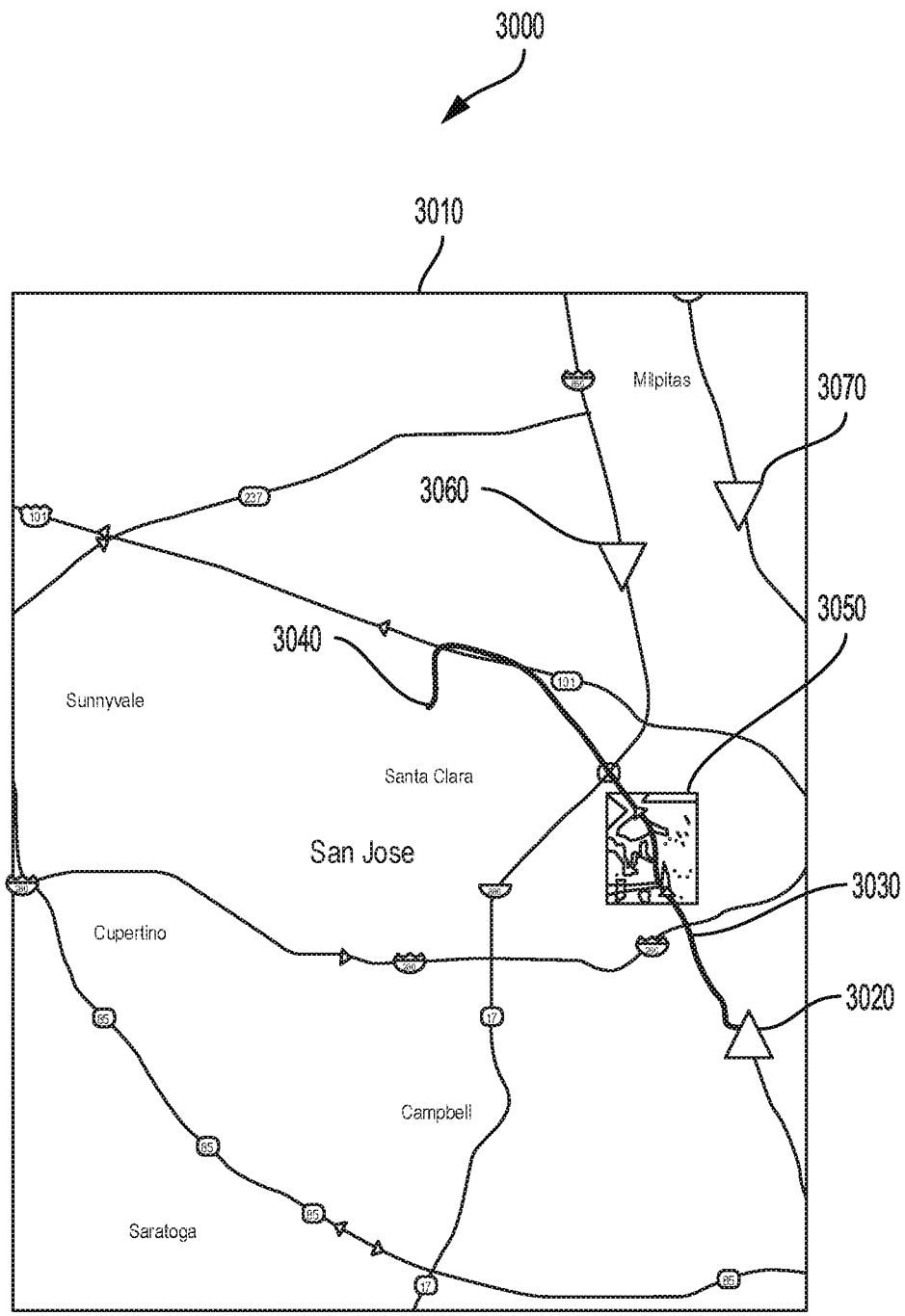
FIG. 3 is a diagram illustrating an example of an risk indicator interface in accordance with the present disclosure.

FIG. 3 is a diagram illustrating an example of risk indicator interface 3000 in accordance with the present disclosure. The risk indicator interface 3000 can be generated based on one or more instructions that are executable on a computing apparatus, including the controller apparatus 2410 shown in FIG. 2, and which can be stored in a memory of a computing apparatus, including the controller apparatus 2410. For example, the risk indicator interface 3000 can be generated by the controller apparatus 2410, based on instructions that are interpreted by a client computing device that accesses the controller apparatus 2410 through a computer network. The client computing device can then generate a representation of the risk indicator interface 3000 on a display device.

The controller apparatus 2410 can include a plurality of components or modules including but not limited to a risk indicator generation module and an electronic communication system (e.g., the electronic communication unit 1320 of FIG. 1). The risk indicator generation module can also be referred to as a risk indicator apparatus. The risk indicator apparatus can generate the risk indicators for display via a graphical user interface (e.g., the risk indicator interface 3000 of FIG. 3) in response to determining risk data using proximities of various external objects (e.g., pedestrians) to the vehicle or vehicles being monitored.

In an implementation, the risk indicator interface 3000 includes a representation of objects that are being monitored or tracked on the environment portion 3010. The environment portion 3010 generates or displays: a vehicle indicator 3020 associated with a vehicle that is being monitored, a vehicle route indicator 3030 associated with the vehicle, a vehicle destination indicator 3040 associated with the vehicle, a congestion area indicator 3050, and external object indicators 3060/3070.

The environment portion 3010 includes a representation of a plurality of objects, including the vehicle indicator 3020 and the external object indicators 3060/3070 of a plurality of external objects that are external to the vehicle. The representation of the external objects can be based on data relating to the state or condition (e.g., appearance, direction of movement, identity) of actual objects within an actual geographical area. For example, the external objects can include other vehicles, including the vehicle 2100 shown in FIG. 2.

The vehicle and the external objects can be represented as indicators such as the vehicle indicator 3020, which can be generated as a variety of images including but not limited to static images, dynamic images, moving images, a real-time stream of images or video, or any combination thereof. Furthermore, the features and characteristics of objects within the geographical area represented by the environment portion 3010 can be based on the actual appearance of the objects that can be obtained or received from remote data sources or sensors (e.g., satellite images, vehicle sensor images, traffic signal camera images). Moreover, objects can be represented in the environment portion 3010 as images including indicators or other symbolic representations including icons, text, pictograms, or any combination thereof.

The environment portion 3010 can receive input including any of touch inputs (e.g., touching a touch screen such as a capacitive display), voice inputs (e.g., speaking into a microphone), and inputs from an input device (e.g., keyboard or stylus). Based on the input, the environment portion 3010 can modify the way that images within the environment portion 3010 appear including but not limited to: magnification of some or all of the images (e.g., increasing the size of a subset of the plurality of external objects or zooming into the area that is displayed within the environment portion 3010); shrinking some or all of the objects, including zooming out from the area that is represented; changing the viewing angle, including changing to an overhead view (e.g., map view). In this way, an interaction with a portion of the environment portion 3010 can result in the display of additional data related to anything displayed on the environment portion 3010 including, for example, the external objects.

The vehicle route indicator 3030 can include a representation of a route or path that a vehicle such as the vehicle represented by the vehicle indicator 3020 can travel from a current location to a destination, including the vehicle destination indicator 3040. The vehicle route indicator 3030 can be generated based on route data including any of vehicle route data and external object route data based on a route that is currently traveled, was traveled previously, or will be traveled, by the vehicle and the external objects respectively. In an implementation, the vehicle indicator 3020 and the external object indicators 3060/3070 are represented by a shape (e.g., a triangle or any other shape with a point) that point in the direction of the current travel via a point or aspect of the shape. For example, the triangle shape of the vehicle indicator 3020 is pointed upwards and the triangle shape of the external object indicators 3060/3070 are pointed downwards indicating a potential overlap in routes that could cause issues.

The congestion area indicator 3050 represents a type of advanced warning or risk indicator that selects an area that is experiencing vehicle congestion at a high level (e.g., a high density of vehicles and pedestrians within the area or a level above a predetermined level that is marked as high). Based on the congestion area indicator 3050, an alternate route to the destination can be selected (or is automatically implemented) in order to reduce the probability of an adverse event occurring (e.g., a collision between the vehicle and one of the external objects in the congestion area represented by the congestion area indicator 3050).

The steps, or operations, of any method, process, or algorithm described in connection with the implementations of the disclosed technology herein, may be implemented in hardware, firmware, software executed by hardware, circuitry, or any combination thereof. To facilitate explanation, the techniques 4000-9000, shown in FIGS. 4-9, are depicted and described as a series of operations. However, the operations in accordance with this disclosure can occur in various orders or concurrently. Additionally, operations in accordance with this disclosure may occur with other operations not presented and described herein.

Figure 4:
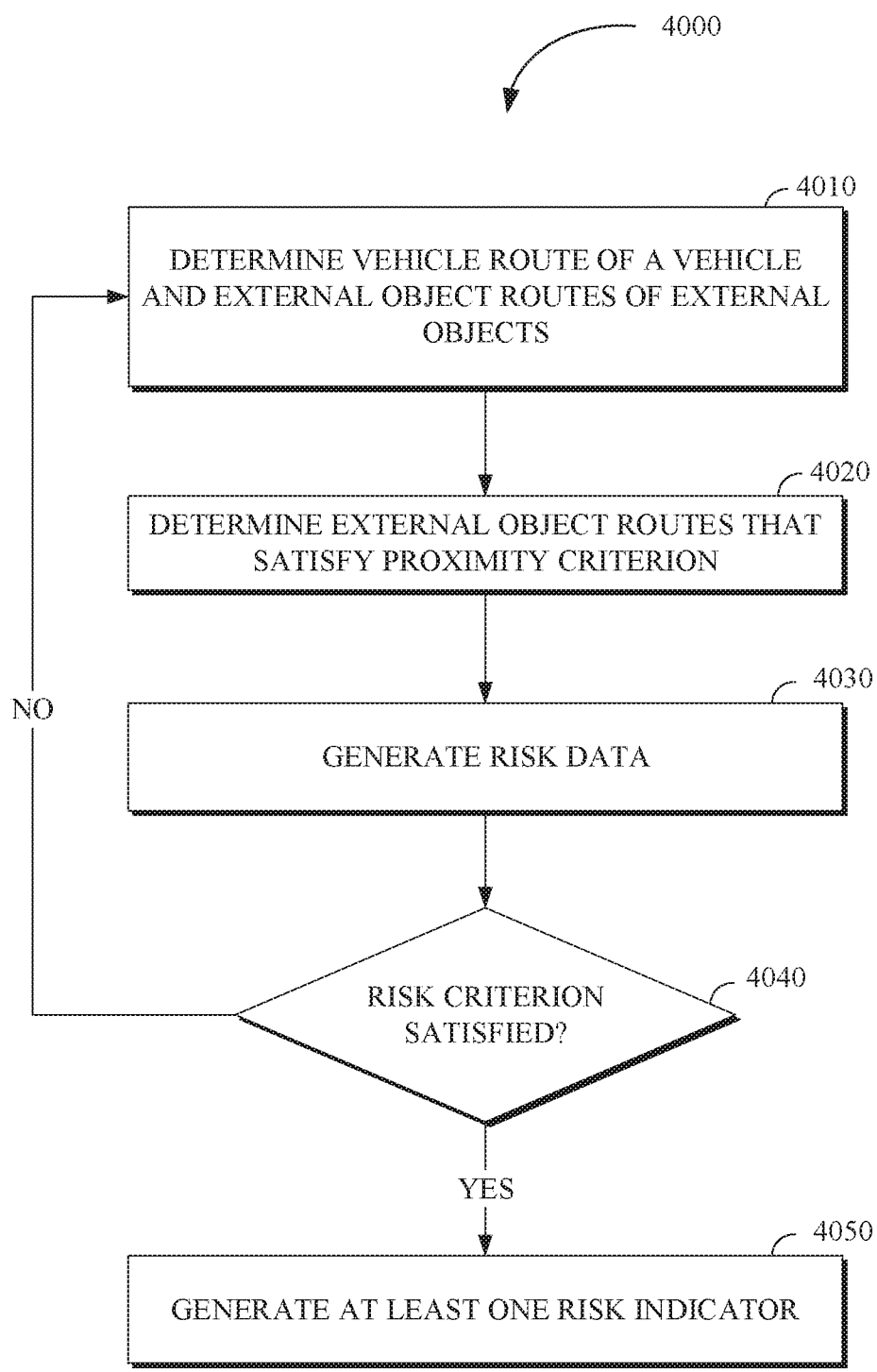
FIG. 4 is a flow chart of a technique for generating risk indicators in accordance with the present disclosure.

FIG. 4 is a flow chart of a technique 4000 for generating risk indicators in accordance with the present disclosure. The technique 4000 is utilized by an advanced threat warning or risk indicator system that can include an interface including but not limited to the risk indicator interface 3000 of FIG. 3. Some or all of the technique 4000 for generating risk indicators may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a risk indicator generation module or the controller apparatus can comprise a risk indicator generation module. In an implementation, some or all aspects of the technique 4000 for generating risk indicators can be implemented in a system (e.g., the controller apparatus 2410 of FIG. 2) combining some or all of the features described in this disclosure.

At operation 4010, a vehicle route of a vehicle and a plurality of external object routes of a plurality of external objects are determined. The vehicle can include a device or apparatus (e.g., a conveyance) that is used to transport objects including any of one or more passengers and cargo. Further, the vehicle can include a communication system to exchange (send or receive) signals including data (e.g., vehicle route data associated with the route of a vehicle). The vehicle can include any of an autonomous vehicle, a vehicle that is driven by a human driver, and a semi-autonomous vehicle.

The external objects can include, but are not limited to, any type of object including any object that is external to the vehicle including any of: other vehicles, including trucks and automobiles; structures including buildings, roadways, and utility structures (e.g., telephone poles); people, including pedestrians; and any natural or artificial object.

The vehicle route can be based on, but is not limited to, vehicle route data and the external object routes can be based on, but are not limited to, external object route data. The vehicle route data can be associated with the route or path of the vehicle through an area including a geographical area. The vehicle route data can be based on properties or attributes of any of the vehicle and the route of the vehicle including but not limited to any of: a vehicle location, including the current location (e.g., current geographical location) and past locations of the vehicle (e.g., latitude and longitude of the vehicle during a previous time period); other similar vehicles that have had similar routes; one or more current vehicle destinations of the vehicle including paths or routes to the destinations; and one or more past vehicle destinations of the vehicle including previously traveled paths or routes to the destinations.

The external object route data can be associated with the route or path of the external objects through an area (e.g., a geographical area). The external object route data can be based on properties or attributes of any of the external objects or a route of the external objects. The external object data can include, but is not limited to, any of: external object locations, including the current locations (e.g., current geographical location) and past locations of the external objects (e.g., latitude and longitude of the external objects during previous time periods); other similar external objects that have had similar routes; one or more current external object destinations of external objects including paths or routes to the destinations; and one or more past external object destinations of the external objects including previously traveled paths or routes to the destinations.

At operation 4020, the external object routes that satisfy a proximity criterion are determined based on a comparison of the vehicle route data to the external object route data. The comparison of the vehicle route data and the external object route data can include a comparison of any of the properties or attributes of the vehicle route data to any of the properties or attributes of the external object route data. In some implementations, the vehicle route data and the external object route data can be compared to other datasets including, but not limited to, data related to the location and movement of the vehicle and the external objects.

In some implementations, the vehicle location over a predetermined time period can be compared to the locations of the external objects over the same predetermined time period. The predetermined time period can include time periods in the past, from which past movement patterns of the vehicle and the external objects can be determined. For example, a vehicle that travels between a home location and a work location along the same route from Monday to Thursday and is on the same portion of the route can be predicted to follow the same route on Friday. In this way, when a predetermined route is not available for the vehicle or the external objects, a route for the vehicle or the external objects can be predicted based on past movement patterns of the vehicle or the external objects respectively.

The proximity criterion can be based on various factors associated with the proximity of the vehicle to the external objects including, but not limited to, any of: a number of times that the vehicle route intersects (e.g., passes through) any of the external object routes; a number of times that the vehicle is within a predetermined distance of any of the external objects or the external object routes; the duration that the vehicle will be within a predetermined distance of the external object (e.g., a time that the vehicle trails a group of external objects, including automobiles, in a traffic jam) or the external object routes; a time when the vehicle route intersects or is within a predetermined distance of any of the external object routes (e.g., a vehicle route intersecting an external object route during rush hour); and a location where the vehicle route intersects or is in close proximity (e.g., a predefined proximity distance) to any of the external object routes (e.g., a vehicle route intersecting an external object route in a congested urban area).

The determination of the external object routes that satisfy the proximity criterion can be based on the value of one of the properties or attributes of any of the vehicle route data and the external object data equaling a proximity threshold value, exceeding a proximity threshold value, or being less than a proximity threshold value. Furthermore, satisfaction of the proximity criterion can be based on the evaluation of more than one of the properties or attributes of the vehicle data and the external object data. For example, satisfying the proximity criterion can include the vehicle being within a predetermined distance value (e.g., less than a distance threshold value) of the external objects for longer than a predetermined time period (e.g., greater than a time threshold value) in order to satisfy the combination of the distance and time criteria.

At operation 4030, risk data for the vehicle is generated based on a vehicle state of the vehicle and external object states of the external objects corresponding to the external object routes that satisfy the proximity criterion. The vehicle state of the vehicle can be based on the state or condition of the vehicle (e.g., normal, needing maintenance, low on fuel). The risk data can be used to indicate the magnitude of a risk (e.g., a threat to the structural integrity of a vehicle or to the safety of passengers in the vehicle) to the vehicle. The risk data can be modified (e.g., increased to reflect greater risk) based on a determination of a higher or lower probability of an adverse event (e.g., an event that causes harm to the vehicle or passengers in the vehicle) occurring. Furthermore, the risk data can be modified based on a determination of the severity of an adverse event that can occur (e.g., an adverse event that can result in minor damage to a vehicle's bumper will have a lower severity than an adverse event that can result in the vehicle being overturned).

The vehicle state of the vehicle can be based on the condition or state of properties or attributes including, but not limited to, any of: kinetic data relating to any of the velocity and acceleration of the vehicle; location data, including any of a location of the vehicle such as the geographical location of the vehicle (e.g., the latitude and longitude of the vehicle), the location of any of the vehicle with respect to another object (e.g., the external objects), and the location of the vehicle with respect to a type of area (e.g., school zone, fire lane, parking lot); position data, including the orientation and inclination (e.g., slope of the vehicle on an incline) of any of the vehicle; operational data relating to the operational state of the vehicle, including the electrical state or mechanical state of the vehicle (e.g., health of the vehicle's electrical systems, mechanical systems, tire pressure, etc.); maintenance data associated with ongoing maintenance of any of the vehicle including scheduled tune-ups; energy state data, including an amount of fuel remaining or an amount of battery charge remaining in the vehicle; and sensor data based sensors of the vehicle including any of optical sensors (e.g., light detection and ranging sensors), audio sensors, and motion sensors, wherein the sensor data can be used to generate a representation of the physical environment in and around the vehicle.

The external object states of the external objects can be based on the condition or state of properties or attributes including, but not limited to, any of: kinetic data relating to any of the velocity and acceleration of the external objects; location data, including any of a location of the external objects such as the geographical location of the external objects (e.g., the latitude and longitude of the external objects), the location of the external objects with respect to another object, and the location of the external objects with respect to a type of area (e.g., school zone, fire lane, parking lot); position data, including the orientation and inclination (e.g., slope of an external object on an incline) of the external objects; operational data relating to the operational state of the external objects, including the electrical state or mechanical state of the external objects (e.g., health of the external objects the electrical systems, mechanical systems, tire pressure, etc.); maintenance data associated with ongoing maintenance of the external objects including scheduled tune-ups; energy state data, including any of an amount of fuel remaining and an amount of battery charge remaining in an external object; and sensor data based on sensors of the external objects including any of optical sensors (e.g., light detection and ranging sensors), audio sensors, and motion sensors, wherein the sensor data can be used to generate a representation of the physical environment in and around the external objects.

The risk data can be determined based on the properties or attributes of the vehicle state and the external object states. The risk data can be associated with the magnitude or frequency of any of the properties and attributes of the vehicle state and the external object states including any of: a linear relationship (e.g., all else being equal, risk data that includes a risk value of ten when two stop signs on a vehicle route are missing can have a risk value of twenty when two stop signs on the same vehicle route are missing); an inverse relationship (e.g., a risk value associated with the risk data can decrease when the distance between the vehicle and the external objects increases); and a non-linear relationship, including any of logarithmic, geometric, and exponential relationships (e.g., the risk value associated with the risk data can exponentially increase in relation to a linear increase in vehicle velocity). The risk data can be expressed in various ways including any of a single value (e.g., a single numerical value), multiple values, and a vector value (e.g., a feature vector including a set of numerical feature values).

Furthermore, the properties or attributes of the vehicle state and the external object states can be weighted to reflect the importance of the respective properties or attributes of the vehicle state and the external object states. For example, the velocities and directions (e.g., a vehicle and an external object moving towards a common point at high velocity) of the vehicle and the external objects within a predetermined distance of the vehicle can be weighted more heavily in the determination of the risk data than the amount of fuel remaining in the vehicle or the external objects.

At operation 4040, a determination of whether the risk data satisfies a risk criterion is made. The determination of whether the risk data satisfies the proximity criterion can be based on different comparisons of a risk value (associated with the risk data) to the risk criterion including but not limited to any of the risk value equaling a threshold value, the risk value exceeding a threshold value, and the risk value being less than a threshold value. For example, the risk data or value can be determined to be ten on a scale of one to one hundred (with one corresponding to the lowest level of risk and one hundred corresponding to the highest level of risk). If the risk threshold value is determined to be fifty, then the risk value of ten does not satisfy the risk criterion.

In response to determining that the risk criterion is satisfied, the technique 4000 proceeds to operation 4050. In response to determining that the risk criterion is not satisfied, the technique 4000 returns to operation 4010.

At operation 4050, at least one risk indicator is generated. The risk indicator can be associated with advanced threat warnings. The risk indicator can include but is not limited to any of: a visual indicator (e.g., text indicating that a risk is detected, a flashing light, an image indicating an imminent risk event, etc.); an audible indicator (e.g., a recorded message indicating a risk event is imminent, a chime); and a haptic indicator (e.g., vibration of a surface). For example, the risk indicator can modify an interface that is configured to display information relating to an advanced threat warning system such as the risk indicator interface 3000 of FIG. 3.

The risk indicator can include any of: a type of risk that the vehicle can encounter (e.g., an indication that a pedestrian will be contacted); an estimate of the proximity of the risk in terms of distance (e.g., a bridge has collapsed two hundred meters away); and an estimate of the proximity of the risk in terms of time (e.g., a high velocity vehicle will intersect the vehicle in seven seconds).

Figure 5:
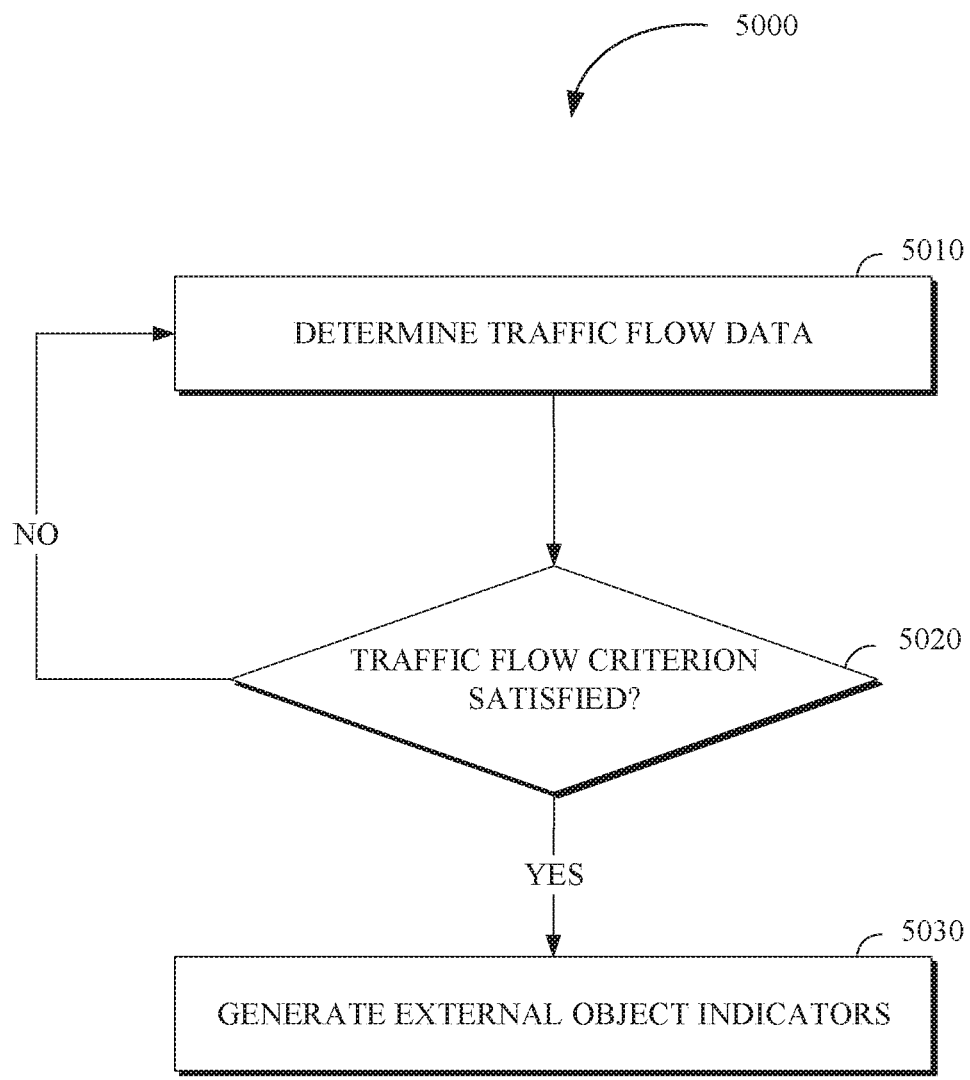
FIG. 5 is a flow chart of a technique for generating risk indicators in accordance with the present disclosure.

FIG. 5 is a flow chart of a technique 5000 for generating risk indicators in accordance with the present disclosure. The technique 5000 is utilized by an advanced threat warning or risk indicator system that can include an interface including but not limited to the risk indicator interface 3000 of FIG. 3. Some or all of the technique 5000 for generating risk indicators may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a risk indicator generation module or the controller apparatus can comprise a risk indicator generation module. In an implementation, some or all aspects of the technique 5000 for generating risk indicators can be implemented in a system (e.g., the controller apparatus 2410 of FIG. 2) combining some or all of the features described in this disclosure.

At operation 5010, traffic flow data is generated based on the external object route data. The external object route data can include but is not limited to any of velocities, densities, and relative locations of the external objects, including the external objects that satisfy the proximity criterion (i.e., the external objects associated with the external object routes that satisfy the proximity criterion). The velocities of the external objects can include the velocities of each of the external objects over time periods including any of a current time period (e.g., the current moment), a past time period (e.g., the previous one minute), and a future time period (e.g., the estimated velocity of each of the external objects for the next two minutes).

The densities of the external objects can be based on the number of external objects within a predetermined area. For example, the predetermined area can include a portion of a roadway and the number of vehicles within the predetermined area can be used to indicate the density of the external objects. In some implementations, the number of external objects can be based on the number of a selected type of external objects (e.g., the number of vehicles or the number of pedestrians).

The relative locations of the external objects can be based on any of: the location of each of the external objects relative to other external objects including any of a distance between the external objects (e.g., the average distance between each truck in a group of trucks is less than two meters); and a trajectory of the external objects with respect to other external objects or the vehicle (e.g., the trajectory of a pedestrian with respect to the vehicle).

The traffic flow data can be generated based on the magnitude or frequency of the properties or attributes of the external route data. In some implementations, the traffic flow data can be based on external route data including any of the velocities of the external objects, the densities of the external objects, and the relative locations of the external objects.

For example, a traffic flow value associated with the traffic flow data can be higher (to indicate a more efficient or increased traffic flow) when the velocities of the external objects increases. When the velocities of the external objects decreases, a traffic flow value associated with the traffic flow data can decrease to indicate that the traffic flow is less efficient or reduced. Furthermore, all else being equal, when the external objects trajectories are aligned in the same direction and the external objects are traveling to a common destination, the traffic flow value can be XXX. A traffic flow value associated with the traffic flow data will be higher or greater (to indicate greater or more efficient traffic flow) when the external objects are further apart (i.e., more distant) than when the external objects are closer together.

At operation 5020, a determination of whether the traffic flow data satisfies a traffic flow criterion is made. The traffic flow criterion can be based on factors associated with the external object route data including the velocities, densities, and relative locations of the external objects that satisfy the proximity criterion. The determination of whether traffic flow data satisfies the traffic flow criterion can be based on different comparisons of the traffic flow data to the traffic flow criterion, including but not limited to any of a traffic flow associated with the traffic flow data value equaling a traffic flow threshold value, a traffic flow associated with the traffic flow data value exceeding a traffic flow threshold value, and a traffic flow value associated with the traffic flow data being less than a traffic flow threshold value.

For example, a traffic flow value associated with the traffic flow data can be determined to be ten on a scale of one to one hundred (with one corresponding to the lowest amount of traffic flow and one hundred corresponding to the greatest amount of traffic flow). If the traffic flow threshold value is determined to be fifty, then the traffic flow value of ten does not satisfy the traffic flow criterion.

In response to determining that the traffic flow data satisfies a traffic flow criterion, the technique 5000 proceeds to operation 5030. In response to determining that the traffic flow data does not satisfy the traffic flow criterion, the technique 5000 returns to operation 5010.

At operation 5030, external object indicators of the external objects corresponding to external object routes that satisfy the proximity criterion are generated. The external object indicators are associated with the risk indicators. The external object indicators can include but are not limited to any of: a visual indicator (e.g., representations of the external objects that reduce or increase traffic flow, including any of pictures, text, and pictograms); an audible indicator (e.g., a ringing or chiming); and a haptic indicator (e.g., vibration of a surface). For example, the external object indicators can modify an interface that is configured to display information relating to an advanced threat warning system. Further, the external object indicators can include any of: the velocities of the external objects; the distance between the external objects; and modifications to the shape or color of the external object indicators based on the velocities or the relative location of the external objects.

Figure 6:
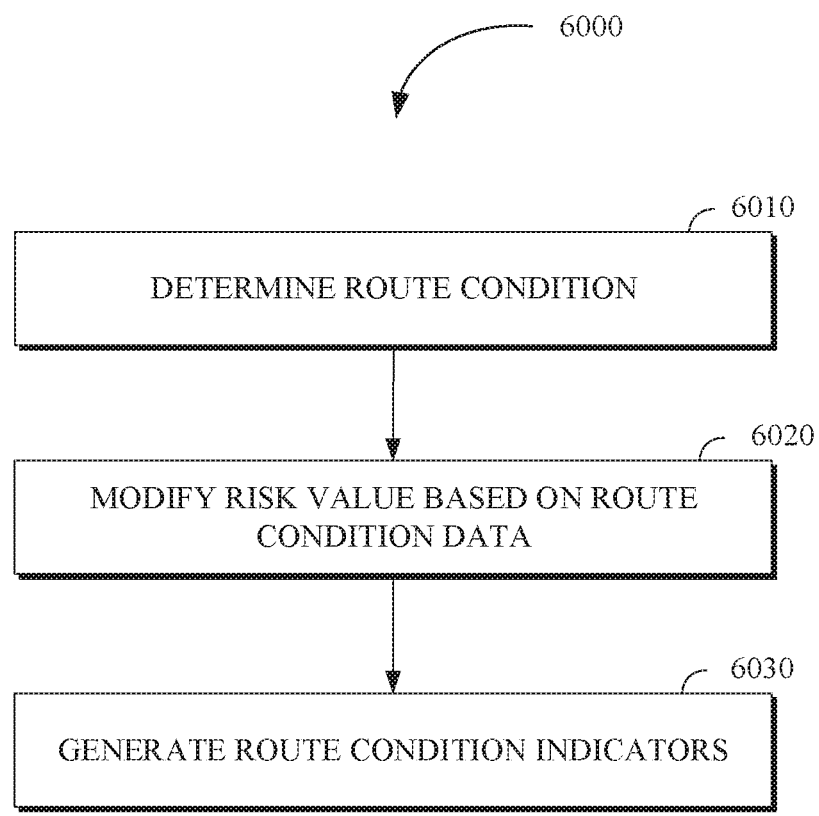
FIG. 6 is a flow chart of a technique for generating risk indicators in accordance with the present disclosure.

FIG. 6 is a flow chart of a technique 6000 for generating risk indicators in accordance with the present disclosure. The technique 6000 is utilized by an advanced threat warning or risk indicator system that can include an interface including but not limited to the risk indicator interface 3000 of FIG. 3. Some or all of the technique 6000 for generating risk indicators may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a risk indicator generation module or the controller apparatus can comprise a risk indicator generation module. In an implementation, some or all aspects of the technique 6000 for generating risk indicators can be implemented in a system (e.g., the controller apparatus 2410 of FIG. 2) combining some or all of the features described in this disclosure.

At operation 6010, a route condition is determined based on route condition data of the vehicle route and the external object routes. The route condition data can include but is not limited to any of: vehicle stoppage data (e.g., the location of vehicles and other external objects that have stopped along the vehicle route); construction activity data (e.g., the location of construction sites and areas that are under repair); lane closure data, including roads and road lanes that are wholly or partially closed; road surface condition data including the state of road surfaces (e.g., slippery or icy road surfaces or large potholes present); pedestrian activity data, including the density of pedestrians within an area; and traffic signal timing data including the timing of traffic signal lights. The route condition data can also be determined using historical data from other vehicles and other external objects and machine learning techniques.

At operation 6020, the risk data is modified based on or updated to include the determined route condition data. A risk value associated with the risk data can be increased, decreased, or remain unchanged based on the route condition data. When the route condition data is indicative of adverse route conditions (e.g., the route is slippery due to ice on the roadways) that can increase the risk of an adverse event (e.g., the vehicle coming into contact with an external object or coming within a predetermined distance of an external object), the risk value associated with the risk data can be increased to indicate that the risk is greater. When the route condition data is indicative of favorable conditions (e.g., dry roads and no traffic signal device failure) the risk value can be reduced to indicate that the risk of an adverse event is lower. When the route condition data indicates neutral conditions or the indications of adverse conditions are offset by route condition data indicating equally favorable conditions, the risk value associated with the risk data can remain unchanged.

At operation 6030, route condition indicators are generated. The route condition indicators are associated with the risk indicators. The route condition indicators can be, based on the route condition data including, but not limited to, any of the vehicle route and the external object routes that satisfy the proximity criterion. The route condition indicators can be based on any output that indicates route conditions including any of: a visual indicator including representations of the route conditions that change the risk data, including any of pictures, text, and pictograms (e.g., images of snowflakes to indicate snow on a roadway); an audible indicator, including verbal indications of the route conditions (e.g., a recorded message indicating that the road is slippery); and a haptic indicator (e.g., vibration of a surface to indicate that a portion of a roadway has adverse route conditions). For example, the route condition indicators can modify an interface that is configured to display information relating to an advanced threat warning system such as the risk indicator interface 3000 of FIG. 3.

Figure 7:
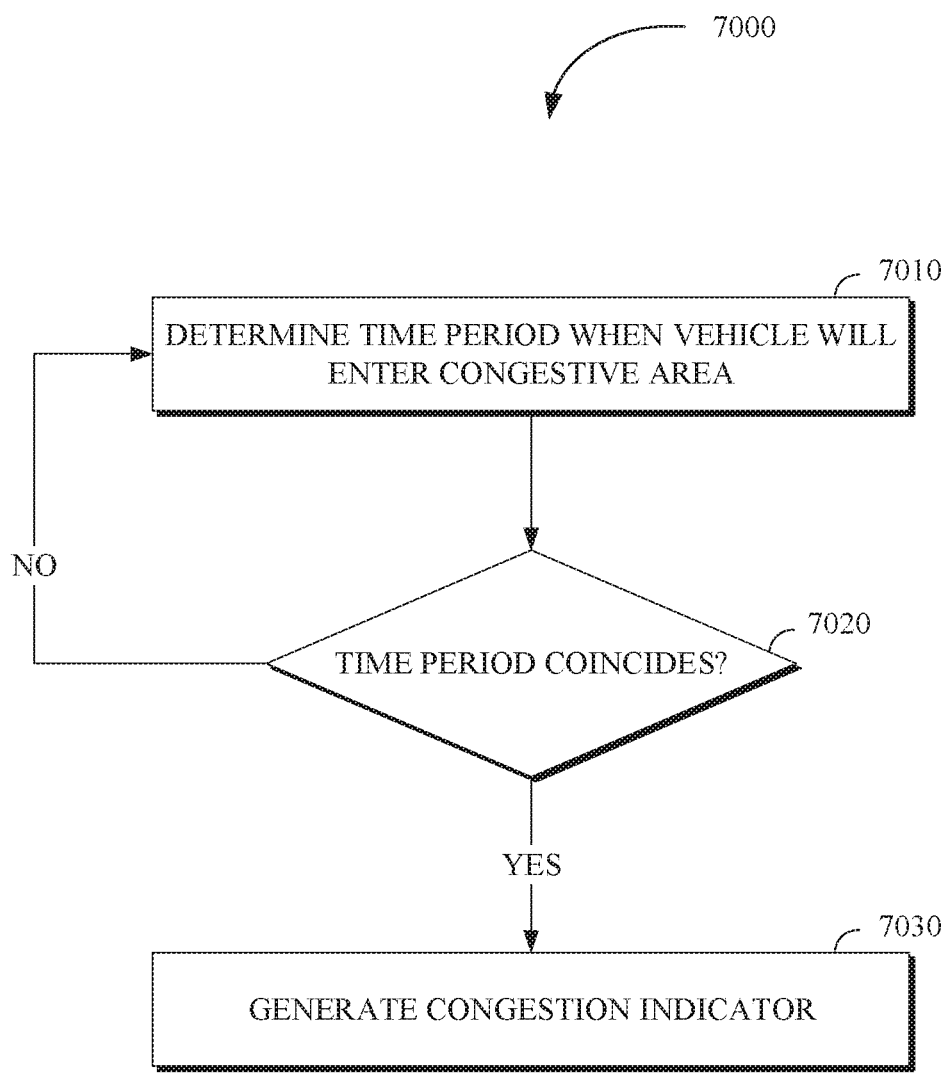
FIG. 7 is a flow chart of a technique for generating risk indicators in accordance with the present disclosure.

FIG. 7 is a flow chart of a technique 7000 for generating risk indicators in accordance with the present disclosure. The technique 7000 is utilized by an advanced threat warning or risk indicator system that can include an interface including but not limited to the risk indicator interface 3000 of FIG. 3. Some or all of the technique 7000 for generating risk indicators may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a risk indicator generation module or the controller apparatus can comprise a risk indicator generation module. In an implementation, some or all aspects of the technique 7000 for generating risk indicators can be implemented in a system (e.g., the controller apparatus 2410 of FIG. 2) combining some or all of the features described in this disclosure.

At operation 7010, a time period during which a congestion event is occurring in a predetermined area which can include a portion (or that is in close proximity) of the vehicle route is determined. The determination of the time period during which a congestion event is occurring in a predetermined area can be based on data associated with congestion events including the external object route data, historical data, and event data (e.g., scheduled concerts and sporting events). The predetermined area can include any of a portion of the vehicle route and an area within a predetermined distance of the vehicle route.

The determination of the time period during which a congestion event is occurring in a portion of the vehicle route can be based on any property or attribute of the external object route data including, but not limited to: the density (e.g., the number of external objects per unit of area) of external objects in the predetermined area during the time period, including any of the number of pedestrians and the number of vehicles; route condition data including portions of the roadways in the predetermined area that are unavailable or inaccessible (e.g., road closures); the velocities of the external objects in the area during the time period (e.g., low velocities of a high density of external objects can be indicative of an area with a higher amount of congestion); and relative locations of the external objects during the time period including choke points (e.g., portions of the roadway that can restrict the movement of external objects in the predetermined area when the chokepoint is closed) that are closed during the time period.

For example, a bridge that can be raised and lowered can limit the movement of external objects that are attempting to leave an area (either under or over the bridge). Accordingly, an area with a high density of external objects and two points of egress (one point of egress being a raisable bridge), can become a congestion area when the raisable bridge is in the raised position.

In an implementation, determination of the time period during which a congestion event is occurring in an area including a portion of the vehicle route can be based on the application of a traffic flow data to the portion of the vehicle route (e.g., the traffic flow data for the portion of the vehicle route satisfies a traffic flow criterion). An example of the use of a traffic flow data is illustrated in FIG. 6.

At operation 7020, a determination is made of whether the time the vehicle will enter the predetermined area coincides (i.e., occurs at the same time) with or corresponds to (e.g., the time of the vehicle entry and congestion event time period can overlap because the traffic from the congestion event might still be present even when the time period has ended) a congestion event time period that occurs in the predetermined area. If the determination is that the time period coincides or corresponds, the method moves to 7030. If the determination is that the time period does not coincide or correspond, the method goes back to 7010. The determination can be based on vehicle route data including the velocity of the vehicle, which can be used to determine an estimated time when the vehicle will enter the predetermined area. The estimated time at which the vehicle will enter the predetermined area can be compared to the time period during which the congestion event will occur. When the time at which the vehicle will enter the predetermined area matches at least one time during which the congestion event is occurring, the time the vehicle will enter the predetermined area and the time period during which the congestion event occur can be determined to coincide.

At operation 7030, one or more congestion indicators for the external objects within the area are generated. The congestion indicators are associated with the risk indicators. The one or more congestion indicators include but are not limited to any of: a visual indicator including representations of the congestion event, including any of pictures, text, and pictograms which can be superimposed over other images (e.g., the color of a portion of a vehicle route can be colored red to indicate a congestion event; an audible indicator, including verbal indications of the congestion event (e.g., a recorded message indicating that the congestion event is occurring); and a haptic indicator (e.g., vibration of a surface to indicate that a congestion event is imminent). For example, the one or more congestion event indicators can modify an interface that is configured to display information relating to an advanced threat warning system such as the risk indicator interface 3000 of FIG. 3.

Figure 8:
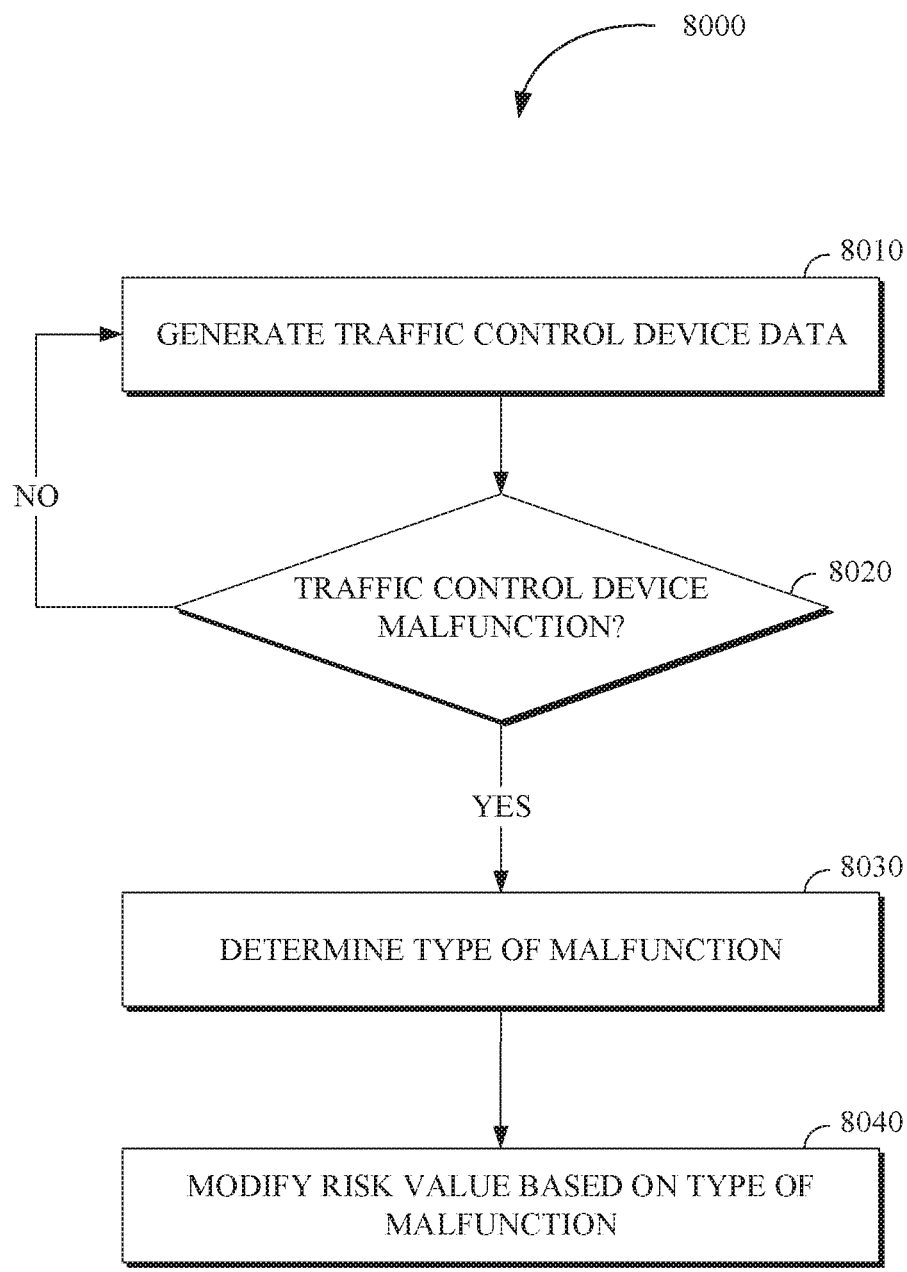
FIG. 8 is a flow chart of a technique for generating risk indicators in accordance with the present disclosure.

FIG. 8 is a flow chart of a technique 8000 for generating risk indicators in accordance with the present disclosure. The technique 8000 is utilized by an advanced threat warning or risk indicator system that can include an interface including but not limited to the risk indicator interface 3000 of FIG. 3. Some or all of the technique 8000 for generating risk indicators may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a risk indicator generation module or the controller apparatus can comprise a risk indicator generation module. In an implementation, some or all aspects of the technique 8000 for generating risk indicators can be implemented in a system (e.g., the controller apparatus 2410 of FIG. 2) combining some or all of the features described in this disclosure.

At operation 8010, traffic control device data is generated. The traffic control device data can be based on a state of one or more traffic control devices located along the vehicle route. The traffic control device data can include properties or attributes associated with any of: traffic signal lights including lights used to determine whether vehicle and pedestrian traffic can proceed (e.g., traffic signal lights with any of green, red, and yellow lights); traffic signage including traffic regulation signage to indicate traffic regulations in an area (e.g., any of stop signs, yield signs, and speed limit signs); roadway surface indicators (e.g., any of lane markers and crosswalks); level crossing devices including any of railway crossing devices and bridge crossing devices; personnel directing traffic; and roadway barriers including barriers to divide roads and lanes with roads.

The traffic control device data can be generated based on data received from the traffic control devices or an operations center including the operations center 2400 illustrated in FIG. 2. For example, an operations center can monitor the status of traffic signal lights and determine that a traffic signal light on the vehicle route has stopped functioning. The non-functioning status of the traffic signal light and the location of the traffic signal light can be included in the traffic control device data. In another implementation, the traffic control device data can be received from other vehicles or external objects (e.g., users transmitting known issues) or via historical data.

At operation 8020, a determination of whether at least one of the one or more traffic control devices is malfunctioning is made based on the traffic control device data. The determination of whether at least one of the one or more traffic control devices is malfunctioning can be based on whether a malfunction criterion is satisfied. The malfunction criterion can be based on the value of one of the properties or attributes of the traffic control device data meeting a condition, equaling a traffic device threshold value, exceeding a traffic device threshold value, or being less than a traffic device threshold value. Further, satisfaction of the malfunction criterion can be based on the evaluation of more than one of the properties or attributes of the traffic control device data. For example, satisfying the malfunction criterion can include but is not limited to any of: a traffic signal light not functioning at all (e.g., not satisfying a currently operational requirement); a traffic signal light generating abnormal signals (e.g., the traffic signals indicating green at all four sides of a four sided intersection); and a roadway surface indicator not being visible (e.g., due to wear caused by vehicles).

In response to determining that at least one of the one or more traffic control devices is malfunctioning, the technique 8000 proceeds to operation 8030. In response to determining that none of the one or more traffic control devices is malfunctioning, the technique 8000 returns to operation 8010.

At operation 8030, a type of the malfunction is determined based on the traffic control device data. For example, the traffic control device data can be compared to a dataset of malfunction types (e.g., a dataset of malfunction types stored in a local or remote server device). The type of malfunction can be determined based on a match (e.g., an exact match or an approximate match within a predefined range) between portions of the traffic control device data and the dataset of malfunction types. At operation 8040, the risk data and associated risk values can be modified based on the type of malfunction. For example, a stop sign that has fallen can increase a risk value associated with risk data. In another implementation, the generated risk indicators are associated with the malfunction data and the risk data thereby includes the malfunction data and types.

Figure 9:
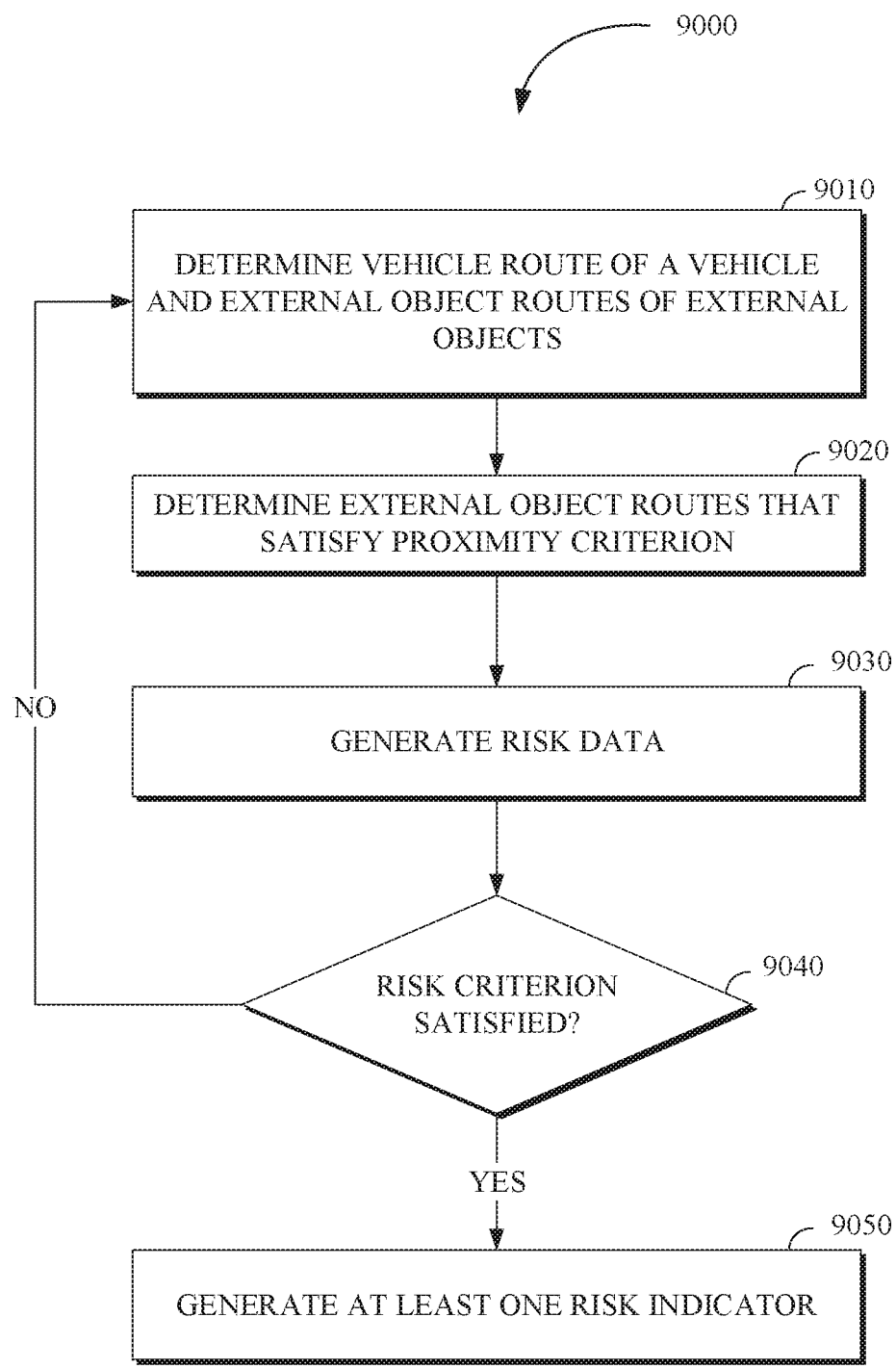
FIG. 9 illustrates a method for generating risk indicators in accordance with the present disclosure.

FIG. 9 illustrates a method 9000 for generating risk indicators in accordance with the present disclosure. The method 9000 can be carried out by a system including but not limited to the controller apparatus 2410 of FIG. 2 or various sub-components or sub-modules or sub-systems of the controller apparatus 2410 including but not limited to a risk indicator apparatus. The method 9000 includes determining a vehicle route of a vehicle and external object routes of external objects, wherein the vehicle route is based on vehicle route data including a vehicle location and a vehicle destination, and the external object routes are based on external object route data including external object locations and external object destinations via 9010. The method 9000 includes determining, based on a comparison of the vehicle route data to the external object route data, the external object routes that satisfy a proximity criterion via 9020, and generating risk data for the vehicle based on a vehicle state of the vehicle and external object states of the external objects corresponding to the external object routes that satisfy the proximity criterion via 9030. In response to determining that the risk data satisfies a risk criterion via 9040, the method 9000 includes generating at least one risk indicator via 9050. In response to determining that the risk data does not satisfy a risk criterion via 9040, the method returns to 9010.

In an implementation, a traffic flow data is determined based on external object route data including velocities, densities, and relative locations of the external objects that satisfy the proximity criterion. In response to determining that the traffic flow data satisfies a traffic flow criterion, external object indicators of the external objects that satisfy the proximity criterion are generated.

In an implementation, sensor data from any of the vehicle and the external objects is received. The sensor data can be based on sensor outputs from any of the vehicle and the external objects, wherein any of the vehicle state and the external object states is based on the sensor data. The method 9000 includes, generating traffic control device data based on a state of one or more traffic control devices located along the vehicle route. In response to determining, based on the traffic control device data, that at least one of the one or more traffic control devices is malfunctioning a malfunction type of the one or more traffic control devices is determined, wherein the risk data is based on the type of the malfunction.

In an implementation, a route condition is determined based on route condition data of the vehicle route and the external object routes. The risk data can be modified based on the route condition data, and route condition indicators are generated based on the route condition data, for the vehicle route and the external object routes that satisfy the proximity criterion. The route condition data can include any of vehicle stoppage data, construction activity data, lane closure data, road surface condition data, pedestrian activity data, and traffic signal timing data. In an implementation, a time period during which a congestion event is occurring in a predetermined area including a portion of the vehicle route can be determined based on the external object route data. In response to determining that a time the vehicle will enter the predetermined area coincides with the occurrence of the congestion event in the portion of the vehicle route, a congestion indicator for the external objects within the portion of the vehicle route is generated.

The disclosed technology provides an advanced threat warning system that more effectively generates indications (e.g., risk indicators) of an adverse event (e.g., an event that can cause harm to a vehicle or passengers of the vehicle). The advanced threat warning system can include a variety of sensors that are able to detect imminent adverse events. Further, the advanced threat warning system can establish connections with data sources, including remote data sources from which data relating to the state of vehicle routes and external object routes can be obtained. Accordingly, the advanced threat warning system can more effectively determine when an adverse event is probable and generate warning or risk indicators corresponding to the potential adverse event. In this way, the safety of the vehicle and passengers within the vehicle is enhanced.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for generating risk indicators, the method comprising:
   determining a vehicle route of a vehicle using vehicle route data including a current vehicle location, a current vehicle destination, and historical vehicle route data;
   determining external object routes of external objects using external object route data including current external object locations, current external object destinations, and historical external object route data;
   comparing the vehicle route data to the external object route data to determine external object routes that satisfy a proximity criterion, the external object routes that satisfy the proximity criterion being within a predefined proximity of the vehicle route during a predefined time period that is determined using past time periods associated with the vehicle;
   generating risk data for the vehicle based on a vehicle state of the vehicle and external object states of the external objects corresponding to the external object routes that satisfy the proximity criterion, the risk data including any of proximity information, severity information, and probability information associated with an adverse event; and
   in response to determining that the risk data satisfies a risk criterion, generating at least one risk indicator including a risk type.

2. The method of claim 1, further comprising:
   generating traffic flow data based on the external object route data including velocities, densities, and relative locations of external objects corresponding to the external object routes that satisfy the proximity criterion; and
   in response to determining that the traffic flow data satisfies a traffic flow criterion, generating external object indicators of the external objects corresponding to the external object routes that satisfy the proximity criterion.

3. The method of claim 1, further comprising:
   receiving sensor data from sensors of any of the vehicle and the external objects, wherein any of the vehicle state and the external object states are based on the sensor data.

4. The method of claim 1, further comprising:
   generating traffic control device data based on a state of one or more traffic control devices located along the vehicle route; and
   in response to determining, based on the traffic control device data, that at least one of the one or more traffic control devices is malfunctioning, determining a malfunction type of the one or more traffic control devices, the risk data including the malfunction type.

5. The method of claim 1, further comprising:
   determining a route condition using route condition data of the vehicle route and the external object routes;
   modifying the risk data using the route condition data; and
   generating route condition indicators, using the route condition data, for the vehicle route and the external object routes that satisfy the proximity criterion.

6. The method of claim 5, wherein the route condition data includes any of vehicle stoppage data, construction activity data, lane closure data, road surface condition data, pedestrian activity data, and traffic signal timing data.

7. The method of claim 1, further comprising:
   determining, based on the external object route data, a time period during which a congestion event is occurring in a predetermined area including a portion of the vehicle route; and
   in response to determining that a time the vehicle will enter the predetermined area corresponds to the time period during which the congestion event is occurring, generating one or more congestion indicators for external objects within the portion of the vehicle route.

8. A risk indicator apparatus comprising:
   a memory; and
   a processor configured to execute instructions stored in the memory to:

determine a vehicle route of a vehicle using vehicle route data including a current vehicle location, a current vehicle destination, and historical vehicle route data;

determine external object routes of external objects using external object route data including current external object locations, current external object destinations, and historical external object route data;

compare the vehicle route data to the external object route data to determine external object routes that satisfy a proximity criterion, the external object routes that satisfy the proximity criterion being within a predefined proximity of the vehicle route during a predefined time period that is determined using past time periods associated with the vehicle;

generate risk data for the vehicle based on a vehicle state of the vehicle and external object states of the external objects corresponding to the external object routes that satisfy the proximity criterion, the risk data including any of proximity information, severity information, and probability information associated with an adverse event; and in response to determining that the risk data satisfies a risk criterion, generate at least one risk indicator including a risk type.

9. The risk indicator apparatus of claim 8, wherein the processor is further configured to execute instructions stored in the memory to:

generate traffic flow data based on the external object route data including velocities, densities, and relative locations of external objects corresponding to the external object routes that satisfy the proximity criterion; and in response to determining that the traffic flow data satisfies a traffic flow criterion, generate external object indicators of the external objects corresponding to the external object routes that satisfy the proximity criterion.

10. The risk indicator apparatus of claim 8, wherein the processor is further configured to execute instructions stored in the memory to:

receive sensor data from sensors of any of the vehicle and the external objects, wherein any of the vehicle state and the external object states is based on the sensor data.

11. The risk indicator apparatus of claim 8, wherein the processor is further configured to execute instructions stored in the memory to:

generate traffic control device data based on a state of one or more traffic control devices located along the vehicle route; and in response to determining, based on the traffic control device data, that at least one of the one or more traffic control devices is malfunctioning, determine a malfunction type of the one or more traffic control devices, the risk data including the malfunction type.

12. The risk indicator apparatus of claim 8, wherein the processor is further configured to execute instructions stored in the memory to:

determine a route condition using route condition data of the vehicle route and the external object routes;

modify the risk data using the route condition data; and generate route condition indicators, using the route condition data, for the vehicle route and the external object routes that satisfy the proximity criterion.

13. The risk indicator apparatus of claim 12, wherein the route condition data includes any of vehicle stoppage data, construction activity data, lane closure data, road surface condition data, pedestrian activity data, and traffic signal timing data.

14. The risk indicator apparatus of claim 8, wherein the processor is further configured to execute instructions stored in the memory to:

determine, based on the external object route data, a time period during which a congestion event is occurring in a predetermined area including a portion of the vehicle route; and in response to determining that a time the vehicle will enter the predetermined area corresponds to the time period during which the congestion event is occurring, generate one or more congestion indicators for external objects within the portion of the vehicle route.

15. A non-transitory computer-readable storage medium including program instructions executable by one or more processors of a risk indicator apparatus that, when executed, cause the one or more processors to perform operations, the operations comprising:

determining a vehicle route of a vehicle using vehicle route data including a current vehicle location, a current vehicle destination, and historical vehicle route data;

determining external object routes of external objects using external object route data including current external object locations, current external object destinations, and historical external object route data;

comparing the vehicle route data to the external object route data to determine external object routes that satisfy a proximity criterion, the external object routes that satisfy the proximity criterion being within a predefined proximity of the vehicle route during a predefined time period that is determined using past time periods associated with the vehicle;

generating risk data for the vehicle based on a vehicle state of the vehicle and external object states of the external objects corresponding to the external object routes that satisfy the proximity criterion, the risk data including any of proximity information, severity information, and probability information associated with an adverse event; and in response to determining that the risk data satisfies a risk criterion, generating at least one risk indicator including a risk type.

16. The non-transitory computer-readable storage medium of claim 15, the operations further comprising:

generating traffic flow data based on the external object route data including velocities, densities, and relative locations of external objects corresponding to the external object routes that satisfy the proximity criterion; and in response to determining that the traffic flow data satisfies a traffic flow criterion, generating external object indicators of the external objects corresponding to the external object routes that satisfy the proximity criterion.

17. The non-transitory computer-readable storage medium of claim 15, the operations further comprising:

receiving sensor data from sensors of any of the vehicle and the external objects, wherein any of the vehicle state and the external object states is based on the sensor data.

18. The non-transitory computer-readable storage medium of claim 15, the operations further comprising:

generating traffic control device data based on a state of one or more traffic control devices located along the vehicle route; and in response to determining, based on the traffic control device data, that at least one of the one or more traffic control devices is malfunctioning, determining a malfunction type of the one or more traffic control devices, the risk data including the malfunction type.

19. The non-transitory computer-readable storage medium of claim 15, the operations further comprising:

determining a route condition using route condition data of the vehicle route and the external object routes;

modifying the risk data using the route condition data; and generating route condition indicators, using the route condition data, for the vehicle route and the external object routes that satisfy the proximity criterion.

20. The non-transitory computer-readable storage medium of claim 15, the operations further comprising:

determining, based on the external object route data, a time period during which a congestion event is occurring in a predetermined area including a portion of the vehicle route; and in response to determining that a time the vehicle will enter the predetermined area corresponds to the time period during which the congestion event is occurring, generating one or more congestion indicators for external objects within the portion of the vehicle route.

* * * * *